United States Patent Office 3,257,765
Patented June 28, 1966

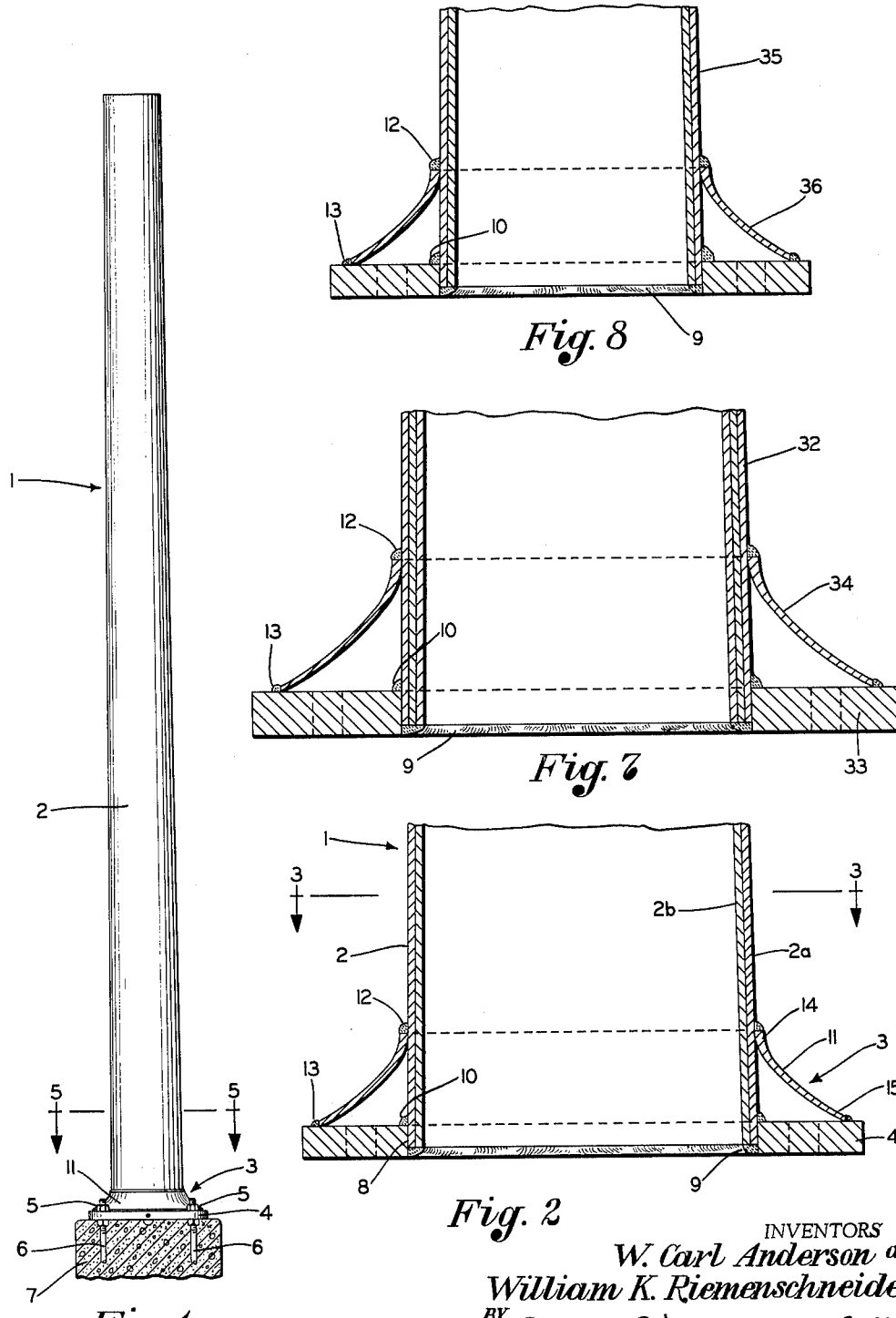

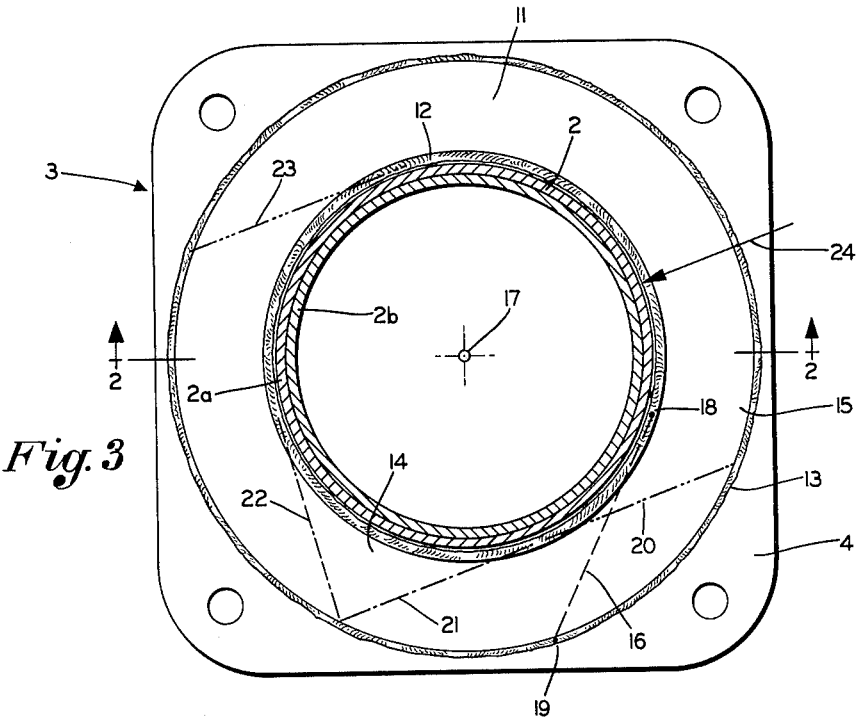
Fig. 3
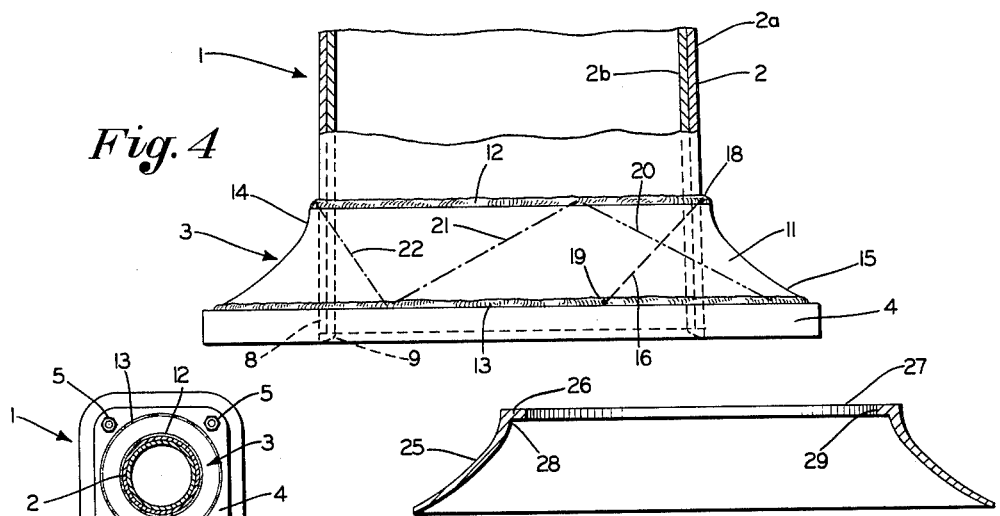
Fig. 4
Fig. 5
Fig. 9
Fig. 6
INVENTORS
W. Carl Anderson and
William K. Riemenschneider
BY Frease, Bishop, Johns & Schick
ATTORNEYS

3,257,765
ANCHOR BASE FOR POLES
W. Carl Anderson and William K. Riemenschneider, Hartville, Ohio, assignors to The Union Metal Manufacturing Company, Canton, Ohio, a corporation of Ohio
Filed May 13, 1963, Ser. No. 279,817
10 Claims. (Cl. 52—298)

The invention relates to a base construction for tubular metal poles used for example for suspending loads of various kinds, such as power transmission lines, telephone lines, traffic lights, lighting fixtures or signs; and more particularly the invention relates to an anchor base construction by which a tubular metal pole may be permanently secured to a flat metal base plate with maximum strength for resisting loads carried between the pole and base plate resulting from loads applied to the pole in any direction, and particularly reversing bending stresses to which the pole may be subjected.

Tubular metal poles, either tapered or cylindrical, and either plain or fluted, are used extensively for supporting or suspending loads of various kinds. Thus, traffic lights, traffic or other signs, lighting fixtures and telephone or power lines are carried by such poles. Typically, such poles may be made of one to say four plies of sheet metal each say 5/16" thick. The poles are provided with metal bases which in turn are secured to foundations in the ground.

The simplest form of base structure for such a metal pole is a flat metal base plate secured to the lower end of the tubular metal pole, and the base plate in turn is bolted to a foundation. Normally, such a base plate is secured to the lower end of a pole by welding.

However, a problem has existed in that it is difficult to obtain sufficient welded connection between the base plate and pole, particularly with heavy multi-ply poles, to provide the required strength for the joint between the base plate and pole to withstand the continued reversing bending stresses to which the pole may be subjected. These bending stresses may originate from any direction by windloading, not only on the pole but upon the load supported or suspended at or from the top or an intermediate portion of the pole.

Prior efforts to increase the strength of the joint between a flat base plate and pole have involved the use of vertical radially extending metal plate struts at the joint, but this arrangement is not satisfactory because the struts tend to cave in or buckle the pole wall when the pole is subjected to severe bending stresses. Furthermore, the reinforcement for the joint provided by radial metal plate struts is not uniform circumferentially of the joint.

These conditions thus have required larger poles with greater wall thickness and thicker base plates involving more metal and higher costs to support or resist any given pole loading than otherwise would be required if ample and uniform strength were present at the joint between the base plate and bottom end of a pole.

Accordingly, there is an existing need in the art for a simple, practical, low-cost anchor base construction for tubular metal poles which relieves the pole of radial buckling forces at the joint between the pole and base, and which provides the strongest joint possible for resisting reversing bending stresses originating from loading applied in any direction to the pole between the pole and base plate with a minimum amount of metal for the pole, base plate and base construction.

Thus, it is a general object of the present invention to provide a new anchor base construction for tubular metal poles of a type in which the lower end of the pole is welded to a flat metal base plate, and in which the base construction includes means for imparting maximum and uniform strength to the joint or connection between the pole and base plate for resisting loads carried between the pole and base plate resulting from loads applied to the pole in any direction.

Furthermore, it is an object of the present invention to provide a new anchor base construction for tubular metal poles which provides substantially increased strength for, and uniform strength circumferentially around the joint means between heavy multi-ply tubular metal poles and base plates welded thereto.

Also, it is an object of the present invention to provide a new anchor base construction for tubular metal poles which eliminates the occurrence of tube buckling forces at a reinforced joint between the lower end of a tubular metal pole and a flat metal base plate.

Moreover, it is an object of the present invention to provide a new anchor base construction for tubular metal poles having uniform strength, reinforced joint means between the bottom end of a pole and a base plate which reduces the size or wall thickness of the metal pole required to carry any given loading as compared with prior constructions.

Also, it is an object of the present invention to provide a new low-cost anchor base construction for tubular metal poles having the strongest possible joint between the pole and a flat metal base plate for resisting reversing bending stresses originating from loading applied in any direction to the pole with a minimum amount of metal for the pole, base plate and base construction.

Finally, it is an object of the present invention to provide a new anchor base construction for tubular metal poles, eliminating difficulties heretofore encountered in the art; eliminating complicated and costly base structures and manufacturing problems heretofore involved; achieving the stated objects in a simple, effective and inexpensive manner; and solving problems and satisfying needs existing in the art.

These and other objects and advantages, apparent to those skilled in the art from the following description and claims, may be obtained, the stated results achieved, and the described difficulties overcome, by the apparatus, combinations, parts, elements, subcombinations, arrangements, relationships and constructions which comprise the present invention, the nature of which is set forth in the following general statement, preferred embodiments of which—illustrative of the best modes in which applicants have contemplated applying the principles—are set forth in the following description and shown in the drawings, and which are particularly and distinctly pointed out and set forth in the appended claims forming part hereof.

The nature of the improved tubular metal pole anchor base construction of the present invention may be stated in general terms as including a preferably flat metal base plate adapted for being bolted to anchor bolts carried by a foundation, there being a pole-receiving opening formed in the base plate, a tubular metal pole formed of one or more sheet metal wall plies, the lower end of the pole being telescoped within the base plate opening and circumferentially welded to the base plate; a metal sleeve, hyperbolic-shaped in cross-section surrounding the lower end of the pole and having an upper edge circumferentially welded to the pole and a lower edge circumferentially welded to the base plate; and said sleeve having a contour formed as a surface of revolution by revolving a straight line about the center of the pole as an axis, with the line extending tangent to the surface of the pole at a point lying in the upper edge of the sleeve and extending downwardly at an angle to intersect the base plate at a point in the lower edge of the sleeve.

By way of example, embodiments of the improved anchor base construction for tubular metal poles are shown in the accompanying drawings forming part hereof in which:

FIGURE 1 is a side view of a tubular metal pole provided with the improved anchor base construction;

FIG. 2 is an enlarged fragmentary section through the improved anchor base construction taken on the line 2—2, FIG. 3;

FIG. 3 is a plan sectional view looking in the direction of the arrows 3—3, FIG. 2;

FIG. 4 is a side elevation, with parts in section, of the parts shown in FIG. 3;

FIG. 5 is a section taken on the line 5—5, FIG. 1;

FIG. 6 is a view similar to FIG. 5 showing a modified form of construction;

FIG. 7 is a view similar to FIG. 2 illustrating a 3-ply pole;

FIG. 8 is a view similar to FIG. 2 showing a smaller diameter 2-ply pole; and

FIG. 9 is a section through a modified form of base sleeve which may be used in accordance with the invention.

Similar numerals refer to similar parts throughout the drawings.

The improved anchor base construction is illustrated and described with particular reference to a plain tapered tubular metal pole formed of steel. It is to be understood, however, that the improved construction may be provided for any type of metal pole, whether cylindrical or tapered, or whether plain or fluted, or whether formed of other metals than steel, such as aluminum and aluminum alloys.

A typical tapered tubular steel pole installation for supporting a load such as a traffic light or sign is shown generally at 1 in FIG. 1 and includes a pole member 2, and the improved base construction indicated generally at 3 having a flat base plate 4 secured by nuts 5 to anchor bolts 6 imbedded in a concrete foundation 7. The pole member 2 may comprise a 2-ply tubular sheet metal wall as illustrated in FIGS. 2, 3 and 4, the outer and inner plies being indicated respectively at 2a and 2b.

Base plate 4 is provided with a central opening 8 telescoped over the lower end of pole member 2 and pole wall plies 2a and 2b are welded continuously around their lower ends at 9 to the base plate 4 within the opening 8. In addition, the outer pole ply 2a preferably is welded at 10 circumferentially around its surface to the upper face of the base plate 4.

If the pole member 2 were a single-ply pole, the construction would be the same as illustrated in FIG. 2 with respect to the outer ply 2a. Normally, the two circumferential welds 9 and 10 in a single-ply pole construction are adequate to withstand and transmit the load for which the pole is designed from the pole to the base plate 4. However, with heavier loading, requiring multi-ply poles, such as the 2-ply pole illustrated in FIG. 2, adequate welding connection between all of the plies and the base plate 4 cannot be obtained. This is because of the lack of adequately anchoring the inner plies to the base plate 4. The inner plies, such as inner ply 2b, are only held in shear by the bottom weld 9.

In accordance with the invention, a specially shaped band, ring or sleeve 11 is provided whose construction will be described hereinbelow. The upper edge of sleeve 11 is welded circumferentially at 12 to pole member 2 and the lower edge of sleeve 11 is welded circumferentially at 13 to the top surface of the base plate 4.

Sleeve 11 may be forged, spun, or rolled from a steel blank or may be formed as a steel casting. Preferably the wall thickness of sleeve 11 will approximate that of one or more of the plies of pole member 2. Preferably the upper portion 14 of sleeve 11 is thicker than the lower portion 15, so as to provide the same amount of metal circumferentially of the upper end 14 of sleeve 11 as is present in the larger diameter lower end portion 15 of sleeve 11.

For a typical installation illustrated in FIG. 2, the weld 12 is spaced upwardly from the top face of bottom plate 4 approximately the same distance that weld 13 is spaced radially outwardly of weld 10. This spacing for the pole illustrated may approximate one-quarter of the bottom diameter of pole 2 for say a 24" diameter pole formed of two 5/16" thick plies 2a and 2b.

Additional strength for the base construction may be obtained by increasing the outer diameter of the lower end of sleeve 11 while maintaining the same sleeve height. However, with an increased sleeve diameter, the bolt circle for the anchor bolts 6 must be enlarged, involving not only an increase in the size of base plate 4 but an increase in the size and volume of the concrete foundation 7. Accordingly, for a foundation of minimum size, the anchor bolt circle should be as small as possible. Thus, the diameter of the lower end of sleeve 11 is held to a minimum size consistent with the strength required.

The thickness of bottom plate 4 is primarily a matter of design. Plate 4 must be strong enough to take the bending moment imposed upon it by anchor bolts 6. As the load for which the pole is designed is increased, and the diameter of the pole, or the thickness of the pole wall, or the strength of the metal used are each or all increased to provide the desired strength, the thickness of the bottom plate also normally would be increased.

However, with the improved base construction including the sleeve 11 designed or shaped in accordance with the invention as later explained, the thickness of base plate 4 may be reduced substantially and yet the base construction will have the necessary and uniform strength for resisting reversing bending stresses to which the pole may be subjected.

Referring particularly to FIGS. 2, 3 and 4, sleeve 11 is hyperbolic-shaped in cross-section (FIG. 2). This shape may be developed as a surface of revolution by revolving a straight line, indicated by dash-lines 16 in FIGS. 3 and 4 about the center or axis 17 of the pole. Line 16 extends (FIG. 3) substantially tangent to the outer surface of pole 2 at a point 18 lying in the upper edge of sleeve 11, and line 16 extends downwardly at an angle to intersect base plate 4 at a point 19 in the lower edge of sleeve 11.

Theoretically, to establish true tangency of line 16 with the surface of pole 2, point 18 should lie in the outer surface of the pole. As a compromise, since sleeve 11 must have some thickness, point 18 is illustrated midway of the thickness of upper edge 14 of sleeve 11. Thus, the surface of revolution developed by revolving line 16, located in the manner stated, about the axis 17 of the pole as a center becomes the medial-warped surface establishing the contour of the sleeve 11.

This surface of revolution is shaped substantially in the form of a hyperbola in cross-section (FIG. 2) and thus sleeve 11 is termed herein as being "hyperbolic-shaped" in cross-section.

In this manner, any straight line drawn from the lower edge 15 of the sleeve 11 at the welded joint 13 angularly upward to the upper edge 14 of the sleeve 11 and substantially tangent to the outer surface of the pole at the weld 12—as illustrated by any of double-dot-dash lines 20, dot-dash lines 21, dot-double-dash lines 22, and triple-dot-dash line 23 in FIGS. 3 and 4—lies in the medial plane of the sleeve 11. Thus, the loads transmitted through sleeve 11 to or from base plate 4 in bending, from points in welded joint 13 between sleeve 11 and base plate 4, travel in straight lines and react tangentially with the tube or pole at the welded joint 12.

For example, referring to FIG. 3, wind or other loading on the pole 2 producing bending of the pole may be represented by the arrow 24. The bending stress resulting from the load represented as acting in the direction of arrow 24 is transmitted at the lower end of pole 2, downward to base plate 4 through sleeve 11 along the tangential lines 21 and 23.

The improved anchor base construction including sleeve 11 constructed and cooperating with pole 2 and base plate 4 in the manner described, relieves the tubular pole of any radial buckling forces at the base connection, and provides the strongest joint possible between the pole and base plate with a minimum amount of metal in the various elements. Also, the joint or connection provided is uniformly strong at all circumferential locations for resisting continued reversing bending stresses to which the pole may be subjected from loads applied to the pole in any direction.

Referring to FIG. 2, the improved base construction may be formed by providing a base plate 4 and sleeve 11 of proper size and thickness for a pole 2 having a diameter and wall thickness of proper design to withstand the loading to which the pole will be subjected. The opening 8 will have been formed in base plate 4 of proper size and shape to be telescoped over the end of pole member 2. Sleeve 11 also will be slipped over the pole and held raised out of contact with base plate 4. The circumferential welds 9 and 10 are then formed. Sleeve 11 is then moved into contact with base plate 4 and welds 12 and 13 are formed completing the anchor base structure.

From a practical standpoint, the improved base construction must be adapted for economical manufacture for poles having a wide range of bottom diameters. This may be accomplished by providing a series of different sized sleeves illustrated in FIG. 9 at 25, each having an inturned flange 26 at the top edge 27 of the sleeve. The flange 26 may project inward say 3/4" from the inner surface 28 of the upper end of the sleeve 25, thus making the inner diameter 29 of the flange 1½" smaller than the inner diameter 28 of the upper end of the sleeve. Any sleeve 25 thus may accommodate poles varying 1½" in diameter by machining or burning off the flange 26 a sufficient amount to enable the sleeve to fit a particular pole in the indicated range.

Referring to FIGS. 5 and 6, the improved anchor base construction is adaptable to designs using any desired number of anchor bolts merely by changing the shape of the base plate, a base plate 30 hexagonal in shape using six anchor bolts 31 being illustrated in FIG. 6.

Referring to FIG. 7, where the pole strength is increased to carry heavier loads, using a 3-ply pole 32, a thicker base plate 33 will be used and a larger diameter, higher sleeve 34, hyperbolic-shaped in cross-section also will be used.

If the pole of FIG. 7 is further increased in strength by using four or more ply pole walls, the height and diameter of the sleeve 34 would be increased.

FIG. 8 illustrates a 2-ply pole 35 of smaller diameter than that shown in FIG. 2 involving a smaller diameter sleeve 36.

Accordingly, the improved construction of the present invention provides a new anchor base for tubular metal poles which is simple, practical and low in cost; which is adapted for tubular metal poles having a wide range of diameters; which solves problems which have existed by providing adequate bases for heavy multi-ply poles; which avoids any radial buckling forces on the pole at the joint between the pole and base plate; which provides the strongest joint possible for resisting reversing bending stresses originating from loading applied in any direction to the pole between the pole and base plate with a minimum amount of metal for the various components; and which eliminates difficulties heretofore encountered in the art, achieves the stated objects, accomplishes the many new functions and results described, and solves problems which have existed in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact structures shown because the sizes of the various parts and components may be varied as indicated to provide other structural embodiments using the hyperbolic-shaped metal base reinforcing sleeve, without departing from the fundamental principles of the invention.

Having now described the features, discoveries and principles of the invention, the construction, operation and use of preferred forms thereof, and the advantageous, new and useful results obtained thereby; the new and useful discoveries, principles, apparatus, combinations, parts, elements, subcombinations, arrangements, structures, relationships and constructions, and mechanical equivalents obvious to those skilled in the art are set forth in the appended claims.

We claim:

1. Tubular metal pole anchor base construction including a flat metal base plate adapted for being bolted to a foundation, the base plate having a top surface and being formed with a pole-receiving opening, a tubular metal pole having its lower end telescoped within the base plate opening, weld means circumferentially connecting the lower end of the pole to the base plate; and a metal sleeve, hyperbolic-shaped in cross-section surrounding the lower end of the pole having an upper edge circumferentially welded to the pole at a zone spaced above the pole-base plate weld, and having a lower edge circumferentially welded to the top surface of the base plate at a zone spaced radially outward of said pole-base plate weld.

2. The construction defined in claim 1 in which the spacing of the sleeve upper edge weld from the pole-base plate weld is substantially equal to the spacing of the sleeve lower edge weld from the pole-base plate weld.

3. The construction defined in claim 1 in which the hyperbolic-shaped cross-sectional contour of the sleeve is developed as a surface of revolution by revolving a straight line about the center of the pole as an axis, with the line extending substantially tangent to the surface of the pole at a point lying in the upper edge of the sleeve and extending downwardly at an angle to intersect the base plate at a point in the lower edge of the sleeve.

4. The construction defined in claim 1 in which the weld means circumferentially connecting the lower end of the pole to the base plate includes a circumferential weld at the lower end of the pole within the base plate opening.

5. The construction defined in claim 1 in which the weld means circumferentially connecting the lower end of the pole to the base plate includes a circumferential weld externally of the pole at the top surface of the base plate.

6. The construction defined in claim 1 in which the weld means connecting the lower end of the pole to the base plate includes a circumferential weld externally of the pole at the top surface of the base plate, and includes another circumferential weld at the lower end of the pole within said base plate opening, and in which the circumferential weld at the upper edge of the sleeve to the pole is spaced above the external pole-base plate weld, and in which the circumferential weld of the lower edge of the sleeve to the top surface of the base plate is spaced radially outward of external pole-base plate weld.

7. The construction defined in claim 1 in which the pole is a multi-ply pole having outer and inner plies, and in which the outer and inner plies are welded at their lower ends to the base plate within the base plate opening by a common continuous weld.

8. The construction defined in claim 1 in which a continuous inturned flange is formed at the upper end of the sleeve welded to the pole.

9. A metal sleeve for use in reinforcing the joint between a tubular metal pole welded to a flat base plate, the sleeve being hyperbolic-shaped in cross-section.

10. Metal sleeve construction as defined in claim 9 in which the upper end of the sleeve has a smaller diameter than the lower end, and in which a continuous inturned flange is formed at the upper end of the sleeve.

No references cited.

RICHARD W. COOKE, JR., *Primary Examiner.*